(12) United States Patent
Murcin (10) Patent No.: US 12,028,579 B2
(45) Date of Patent: Jul. 2, 2024

(54) PLATFORM FOR ADAPTABLY ENGAGING WITH LIVE STREAMING APPLICATIONS, PROVIDING USERS ACCESS VIA AN INTERFACE FRAMEWORK, RECEIVING AND PROCESSING USER PREDICTIONS USING NATURAL LANGUAGE PROCESSING AND MACHINE LEARNING, REDUCING THE PREDICTIONS INTO STANDARDIZED FORMULAE, DETERMINING OCCURRENCE AND VALUE PARAMETERS PERTAINING TO THE PREDICTIONS, FORMULATING PREDICTION VALUE OFFERS BASED ON THE OCCURRENCE AND VALUE PARAMETERS, AND PROPOSING PREDICTION VALUE OFFERS VIA THE INTERFACE FRAMEWORK

(71) Applicant: David C. Murcin, Los Angeles, CA (US)

(72) Inventor: David C. Murcin, Los Angeles, CA (US)

( * ) Notice: Subject to any disclaimer, the term of this patent is extended or adjusted under 35 U.S.C. 154(b) by 0 days.

(21) Appl. No.: 18/188,004

(22) Filed: Mar. 22, 2023

(65) Prior Publication Data

US 2023/0319363 A1    Oct. 5, 2023

Related U.S. Application Data

(63) Continuation-in-part of application No. 17/735,429, filed on May 3, 2022, now Pat. No. 11,623,149, and a continuation-in-part of application No. 16/830,161, filed on Mar. 25, 2020, now Pat. No. 11,354,976, and a continuation-in-part of application No. 15/179,845, filed on Jun. 10, 2016, now Pat. No. 10,610,790.

(51) Int. Cl.
| | | |
|---|---|---|
| G10L 15/18 | (2013.01) |
| G10L 15/06 | (2013.01) |
| G10L 15/16 | (2006.01) |
| H04N 21/2187 | (2011.01) |
| H04N 21/233 | (2011.01) |
| H04N 21/234 | (2011.01) |
| H04N 21/478 | (2011.01) |
| H04N 21/8549 | (2011.01) |

(52) U.S. Cl.
CPC ......... *H04N 21/478* (2013.01); *G10L 15/063* (2013.01); *G10L 15/16* (2013.01); *G10L 15/18* (2013.01); *H04N 21/2187* (2013.01); *H04N 21/233* (2013.01); *H04N 21/23418* (2013.01); *H04N 21/8549* (2013.01)

(58) Field of Classification Search
None
See application file for complete search history.

(56) References Cited

U.S. PATENT DOCUMENTS 9,336,772 B1 *  5/2016  Salvador ............... G10L 15/183
10,614,799 B2 *  4/2020  Kennewick, Jr. ....... G10L 15/18

* cited by examiner

*Primary Examiner* — Sunit Pandya (57) ABSTRACT

A system, method, and platform for enabling users to engage in predictions pertaining to streamed media by receiving natural language predictions from users, standardizing the natural language predictions into formulated predictions, performing occurrence searches of the formulated predictions using literal, significant, and associated terms, determining likelihoods of occurrences based on the results, calculating proposal ratios based on occurrence percentiles, and communicating proposals to users.

20 Claims, 7 Drawing Sheets

PLATFORM FOR ADAPTABLY ENGAGING WITH LIVE STREAMING APPLICATIONS, PROVIDING USERS ACCESS VIA AN INTERFACE FRAMEWORK, RECEIVING AND PROCESSING USER PREDICTIONS USING NATURAL LANGUAGE PROCESSING AND MACHINE LEARNING, REDUCING THE PREDICTIONS INTO STANDARDIZED FORMULAE, DETERMINING OCCURRENCE AND VALUE PARAMETERS PERTAINING TO THE PREDICTIONS, FORMULATING PREDICTION VALUE OFFERS BASED ON THE OCCURRENCE AND VALUE PARAMETERS, AND PROPOSING PREDICTION VALUE OFFERS VIA THE INTERFACE FRAMEWORK

PRIORITY CLAIM

This application is a continuation-in-part of, and claims the benefits of and priorities to the following applications: U.S. non-provisional application Ser. No. 17/735,429, filed May 3, 2022, which claims the benefit of and priority to U.S. non-provisional, application Ser. No. 16/830,161, filed Mar. 25, 2020, which in claims the benefit of and priority to U.S. non-provisional, application Ser. No. 15/179,845, filed Jun. 10, 2016. All of the above referenced applications are incorporated herein as if restated in full.

SUMMARY

The system may comprise a platform, a set of streaming devices, a set of computing devices, a set of input devices, a platform, streaming media detection modules, a recent transpiration recordation module, a context module, a natural language module, a search abstraction module, an occurrence module, an evaluation and proposal formulation module, a proposal communication module, an acceptance determination module, a proposal fulfillment module, an outcome determination module, and a transient desirability module.

Streaming Devices

Streaming devices enable users of the platform to view streaming content. The set of streaming devices may comprise computing devices, display, screens, speakers, and other output devices, including smart mobile devices, smart televisions, headphones or earphones, augmented reality devices such as AR glasses, and virtual reality devices such as VR headsets. Each user of the platform must be in communicative proximity to at least one streaming device. The streaming device streams media from a streaming source, such as a website, channel, station, or application.

Computing Devices

Computing devices provide the computational processing power for the various modules operating in unison with the platform. The set of computing devices may comprise user devices, administrative computing devices, and storage devices. The computer devices and streaming devices may be configured to operate over a network. The network may be private or public.

Input Devices

Input devices enable the users to communicate instructions, particularly predictions about occurrences in the streaming content, to the platform. The set of input devices may comprise microphones, keypads, touch screens, or any other suitable means by which a user can communicate with the system. In order to interact with the platform, each user must be communicatively engaged with at least one input device.

Output Devices

Output devices enable the platform to communicate with the users. The output devices may be co-positional with the streaming devices, since streaming devices may visual and audio output components, or there may be additional output devices separate from the streaming devices, with the streaming devices dedicated to streaming media content and the output devices configured to display or otherwise play communications from the platform.

Modules

The separation of modules provides for the refinement of various functionalities connected with the platform. The platform may comprise or be in communication with various modules, with the modules configured to perform various platform tasks. The modules may comprise expert algorithms designed to calculate using equations provided by programmers and administrators as well as neural networks which may be continually trained to improve and update the quality, integrity, and speed of performance of the various platform tasks. The structures and levels of supervision of the neural networks depend on the module, with many being generative adversarial neural networks (GAN) with semi-supervised learning, with the supervision being supplied by direct feedback from or the detection of the actions of users.

A neural network is a computer algorithm which can be trained via training data to learn features of data in input streams and associate some set of this input data with output data. After learning is complete, or at least sufficiently complete, the neural network can predict output data for some set of input data not present in the training data.

The neural networks in the present application may be arranged in a sequence such that the output of one neural network becomes the input of another neural network. The input of the second neural network may be joined by a second stream of output data derived from a non-neural network, such as a platform or system component configured to receive data or selections from a platform or system user and perform non-neural analysis upon the data or selections. Training data for one neural network may also be formed at least in part by the output of another neural network. Since the neural networks may operate continuously by receiving input data in real-time, additional training may also occur in real-time, particularly as one neural network may create training data for the other neural network and vice versa.

Platform

The platform enables a user to make predictions about occurrences in streamed media, to receive proposal formulations of those predictions with proposal ratios incorporated into them, and to accept or reject such proposals. The platform may comprise a set of websites or software applications. The websites or software applications may be configured to be displayed on and accessed by mobile devices, televisions, and computers. The platform may also comprise an audio navigation interface, enabling a user to navigate the platform via transmitting audio instructions and receiving audio feedback.

The platform may comprise a user interface as well as a backend, with the backend comprising various modules, many of which are described below. The computationally intensive modules, which may operate using neural networks, may run not on the users' streaming devices but instead on administrative computing devices, with the transmission of inputs and outputs to the modules transpiring either via cable, wirelessly, and/or over a network.

The platform may comprise an icon that hovers in a mostly-transparent layer upon the streaming content which the user is engaging, thereby informing the user whether or not the platform is active and receptive to predictions without interfering substantially with the user's engagement with the streaming content. The platform may recognize a user based on the identity of the user account which is currently signed in, and/or based on voice or facial recognition of the user, as detected by video or web cam type devices. Each user account may be dedicated to a single user having a single prediction fulfillment account, or to multiple users with a common prediction fulfillment account, or to multiple users each with their own prediction fulfillment account.

The platform is configured to detect predictions made by the user pertaining to occurrences in a streaming content, and then to calculate the likelihood that the predictions will be confirmed, and based on that calculation, determine a pricing ratio for offering the prediction back to the user as a betting opportunity, such that there is a first numerical value signifying what the user will "win" if the prediction is confirmed, and a second numerical value signifying what the user will "lose if the prediction is negated. The first and second numerical values will be added or substracted, respectively, from the user's fulfillment account, which may be an external bank account, payment portal, or internal bank account, with the internal bank account being hosted by the platform.

The occurrence predicted may consist of simple occurrences, such as whether a player will or will not score a point, catch a ball, throw a ball, etc., in a sporting event, or more complex occurrences, such as whether a particular play call or the execution of a particular strategy will occur. As an example of a complex occurrence, a user may communicate to the platform "The Pistols are going to play the Deep Out Route!" In football, a long pass play (on offense) is completed when the receiver runs toward the sideline, catches the ball, then quickly turns upfield to gain even more yardage.

The occurrence prediction may also relate to an occurrence that is not conventionally intended as part of a sporting event at all, such as whether a fight will occur between players on or off the field or court. Further, the occurrence prediction may relate to an occurrence in the context of a non-sporting event, such as a news program, a television show, a musical recording, a video game, or some other production. Examples of occurrence predictions in the non-sporting event context may include whether a particular topic will be discussed in an interview, whether a particular character slays another character, or apologies to another character in a television show or movie, or whether an animal is going to escape the jaws of a predator in a nature documentary.

Sporting events which may be the content of the streamed media, occurrences during which may be the subject of the user prediction, include football, basketball, baseball, hockey, soccer, cricket, car racing, Olympic sport games, or any other competitive or performance-based game.

Occurrence predictions may also be compound, entailing multiple parts to the prediction. For example, a user may communicate to the platform "Johnny is going to propose to her, and Elizabeth will at first say no, but then change her mind and say yes!" These more complex occurrences are inherently difficult to reduce descriptively, and unlike for simple occurrences, could be meaningfully typified and reproduced across sessions of use of the platform, since they are often too specific and unique to be relevant for any session except the session from which they are conceived by the user.

The user prediction may be merely descriptive of the prediction itself, but it may also include a wager element. The wager element may comprise the user's offer of how much the user is willing to pay if the outcome of the prediction is negated by reality. For example, a user may communicate to the platform "$50 that the Pistols will enact the Deep Out Route!" In this example, the "$50" is the wager element made by the user.

The platform may be a recurring subscription platform, a free-to-play platform, or a free-to-play but pay-for-betting platform. The platform may charge users for each prediction proposal they accept, or merely for each prediction proposal they accept and for which the outcome determination is confirmed. Charges may include a percentile surcharge of the first numerical value (described below) or the wager element. The platform may offer in-app purchases within video games. The platform may also merely receive payment in the form of the second numerical value if the prediction is negated.

Examples of play calls in football include:

A "play-action pass", which is effective in slowing down an overly-aggressive pass rush by the defensive linemen.

A "screen pass", which is appropriate for obvious passing downs (3rd and long yardage), when the defense is attempting to sack the quarterback.

A "draw play", which is effective in manipulating defensive linebackers and cornerbacks, by pushing them back to open up running space.

A "slant route", which is effective in quickly creating separation for the receiver from the defender, as soon as the ball is snapped.

A "deep out route", which is a long pass play from the quarterback to the receiver, who runs toward the sideline, catches the ball, then quickly turns upfield to gain even more yardage.

Examples of play calls in basketball include:

A "pick and roll", which enables offensive players to score by either rotating out, away from the basket to take a shot, or, pass the ball to another offensive player who is open for a shot.

A "triangle offense", which confuses the defense, by spacing three players in a sideline triangle, to create a scoring opportunity from the perimeter area of the court.

A "fast break", which does not give the opposition time to slow down and catch their breath. This strategy is utilized to wear out the defense, and force them into defensive mistakes.

Examples of play calls in baseball include:

A "sacrifice bunt", in which an attempt is made to advance a runner at least one base with a bunt. The strategy is for the batter to sacrifice himself (giving up an out), in order to move another runner closer to scoring.

An "intentional walk", which enables a powerful hitter to reach first base instead of giving him a chance to hit the ball. The next batter in the lineup is expected to be an easier out.

A "changeup pitch", which may be used when batter has a tendency to start his swing well before the pitch arrives, usually resulting in a swing and miss, or very weak contact with the ball.

A "knuckleball pitch", which is used because knuckleballs come to the batter at a much lower velocity than the average pitch, fluttering unpredictably. A hard pitch to hit, because it moves so erratically.

A "curveball pitch", which is selected to keep the hitter off balance, because this pitch has more movement than most. If the batter is expecting a fastball, he will swing too early, and over the top of the curveball.

A "slider pitch", which is selected to trick the batter into thinking they are seeing a fastball coming to the plate. The pitcher uses the same arm angle and delivery motion as their fastball—just up to the point when they release the ball.

A "sinker pitch", which is selected to force the batter into hitting weak ground balls, due to significant downward and horizontal pressure on the fastball.

Streaming Media Detection Modules

Streaming media detection modules enable the platform to determine what is being streamed via the streaming devices. The platform may comprise pre-streaming and post-streaming media detection modules. The post-streaming media detection module may operate as software running simultaneously with, coupled to, or embedded in a streaming application, and is configured to identify, via image and/or audio capture, the identity of the streaming media. By recording samples of the image or audio features of a streamed content and comparing those samples to a database of streaming content, the post-streaming media detection module may determine whether there is a match. The determining may be based on just information which the user has access to while watching or listening to the streaming content. The pre-streaming media detection module may also operate as software running simultaneously with, coupled to, or embedded in a streaming application, and may also be configured to identify the identity of the streaming media; but here, the identification is made by receiving meta-data associated with the streamed content. The meta-data may itself provide the identity of the streamed content, or it may provide information which the pre-streaming media detection module can use to search in a streaming content database for a media identity with matching meta-data.

The streaming content database may be administratively managed and stored locally or in the cloud. The streaming content database may be owned by administrators of the platform, or may belong to a third party, such as IMDb®. The streaming content database may be designed to be read and navigated by consumers of online content, or may be formatted merely for systems to access, save, edit, and retrieve data.

Recent Transpiration Recordation Module

The recent transpiration recordation module is intended to assist various modules in understanding what is happening in the streaming media, particularly as it pertains to the occurrence which is the subject of the prediction communication. The recent transpiration recordation module is configured to describe and summarize events, facts, or features of the streaming content across a plurality of timespans using neural networks. Timespans signify the lengths of time which the summaries are intended to cover, and examples may include: one minute, five minutes, ten minutes, half an hour, one hour, etc. The number and selection of timespans may be determined by processing the primary context data which identifies the form, category, and identity of the streaming content, or may be determined by the neural network. The recent transpiration recordation module may receive audio and video data from the streaming device, process the audio and video data using neural networks trained to recognize images and natural language, summarize the content across the designated timespans, and then standardize the summaries into standardized summary streams. The recent transpiration recordation module then transmits the standardized summary streams to the natural language processor, the context module, and the search abstraction module.

Standardization of the summaries may involve the identification of a set of subjects, such as characters, players, persons, performers, or other entities, a set of occurrences such as circumstances experienced by them or actions undertaken by them, and a set of objects from which the circumstances are actuated or upon which those actions are applied, with the objects including objects lacking agency, or objects having agency, such as other characters, players, persons, performers, or other entities. The standardization of the summaries may involve breaking down descriptions into the three categories of subjects, occurrences, and objects, if applicable, with one tripartite standardized summary preceding a subsequent tripartite standardized summary, and so on. A standardized summary stream comprises a set of these tripartite standardized summaries, with the number of standardized summaries in a stream dictated either administratively, or determined by the neural networks of the recent transpiration recordation.

The recent transpiration recordation module may post the standardized summary streams on an online application or website, in a forum or social media page dedicated to the form, type, or identity of the media being summarized. Feedback from other users of the same may be processed by the recent transpiration recordation to, first, determine whether the standardized summary streams are deemed accurate or inaccurate, and second, to determine what portion is deemed inaccurate. This feedback is then used as training data for additional training by the neural networks comprising the recent transpiration recordation module.

Context Module

The context module is intended to assist various modules of the platform in understanding the context of the occurrence which is the subject of the prediction communication, particularly contextual elements which would not otherwise be captured in the standardized summary streams. The context module may receive identification data from the pre- and/or post-streaming media detection modules and standardized summary streams from the recent transpiration recordation module (collectively, "context module input"). The identification data is then used by the context module to search for additional data, namely context data, pertaining to the streaming content, with the search performed across internet webpages, online applications, and media databases. The context module may format the context data into a form usable by the natural language module, and therefore the output of the context module may referred to as processed context data. In addition, the context module may transmit the processed context data to the recent transpiration recordation module to assist in creating the standardized summary streams.

Natural Language Module

The natural language module is designed to understand the prediction communications made by the user and to standardize the format of that prediction communication into a form that is more easily processed by other modules. The natural language module may comprise a set of neural networks configured to handle natural language communications from users as input. The natural language communications include predictions pertaining to an occurrence in streamed content. The natural language communications may be received via any of the input devices mentioned previously. To assist in understanding the meaning of the natural language communications, the natural language module may also receive processed context data from the context module and standardized summary streams from the recent transpiration recordation module.

The natural language module may be configured to formulate the prediction into a standardized format and communicate the formulated predictions to the occurrence module and the search module.

The standardized format may identify a number of discrete predictions, with each discrete prediction having the same tripartite subject, condition or action, and object structure used by the standardized summary streams.

To assist in further training, if the user indicates that the local proposal communication received from the proposal fulfillment module does not match the initial prediction uttered by the user, this complaint of non-matching is together with the natural language communication and the formulated prediction added to training data for the natural language module.

Context Data

The context data may be created prior to, concurrently with, or subsequent to the receipt of the natural language communications received from the user. The context data may include so called "primary context data", which may refer to the form, type, or identity of media with which the user was engaged at the time in which the natural language communication was received. Generally, the media is encapsuled in some form of audio and/or visual medium, such as digital content streaming. The streaming may be transmitted onto any of the computing devices previously mentioned, such as a television, computer, or mobile device, and via an internet website, a software application, or a channel, and the form may be dictated by the device and interface. The type of the media may correspond in part to a category of its content—the category may be an event, a production, or a combination thereof. More specifically, the category may be an event such as a sporting event, ceremony, or other so-called "candid" footage; or a production, which is generally heavily edited and compiled prior to its first streaming, such as a movie or television show. The category may also be a combination of event and production, such as a news program which couples event footage with commentary about said footage. Sub-categories may also be included in the context data. Examples of sub-categories include: football game, stand-up comedy, action film, video game, musical performance etc.

The identity of the media may relate to a particular instantiation of a category or sub-category. For example, the identity may designate a particular sporting event, such as "The Goblins vs. The Acrobats, September 9, 202X, Parnassus Stadium".

Context data may also include so-called "secondary context data", which may include names of individuals participating or otherwise appearing in an event, or acting in or otherwise involved with a production. Further, in the event of productions involving fictional content, the names of any fictional characters may be included as well. If the form of the production is that of an episode in a series, then the secondary context data may include the script, plot summaries, so-called "Easter Eggs", synopses or articles written about prior episodes in the series.

Secondary context data may include external data, such as descriptions of or discussions about the event or production on official websites, fan-sites, social media posts, podcasts, and news articles.

Search Abstraction Module

The search abstraction module is intended to capture information which may assist in determining the likelihood of an occurrence beyond that which may be self-evident from the processed context data from the context module, the identification data from the streaming media detection modules, and the standardized summary streams from the recent transpiration recordation module. The search abstract module is in particular configured to capture such information by searching using significant and associated terms found in definitions of terms used in the formulated predictions, the processed context data, and the standardized summary streams. Crucially, the search abstract module does not use the identification data from the streaming media detection modules, because including that identification data in the search would unnecessarily limit the results to information pertaining to an occurrence which has not yet been resolved.

The search abstraction module is configured to receive formulated predictions from the natural language module, and perform internet searches using the formulated predictions, the processed context data, and the standardized summary streams.

In a first iteration, the search abstraction module is configured to conduct a so-called first abstraction layer search using the literal terms in the formulated predictions, and captures a first set of results.

In a second iteration, the search abstraction module incorporates the processed context data and the standardized summary streams into the search The search abstraction module looks up each literal term in the formulated prediction, and finds a basic definition of each term, and identifies the most significant terms in the definition. Then the search abstraction module conducts a second abstraction layer search using the significant terms in the definition together with the processed context data and captures a second set of results, and a third abstraction layer search using the significant terms in the definition together with the standardized summary streams and captures a third set of results.

In a third iteration, in order to broaden the information captured, the search abstraction module separately searches using terms associated with the significant terms, but does not include the significant terms themselves. Accordingly, the search abstraction module looks up terms associated with the most significant terms, such as synonyms, and conducts a fourth abstraction layer search using the associated terms in conjunction with the processed context data and captures a fourth set of results, and a fifth abstraction layer search using the associated terms in conjunction with the standardized summary streams and captures a fifth set of results.

In a fourth iteration, the search abstraction module searches for a negated form of the literal terms, capturing a sixth set of results. Negated versions may consist of antonyms, or merely include "no" or "not" prior to a noun or verb. The inclusion of negated versions of the terms enables the search abstraction module to capture information where the occurrence of the prediction communication or similar occurrences do not occur.

In a fifth iteration, a negated version of the significant terms is used to capture a seventh set of results. Thereafter, a negated version of the significant terms in conjunction with the processed context data is used to capture an eighth set of results. Then, a negated version of the significant terms in conjunction with the standardized summary streams is used to capture a ninth set of results.

In a sixth iteration, a negated version of the associated terms is used to capture a tenth set of results. Thereafter, a negated version of the associated terms in conjunction with the processed context data is used to capture an eleventh set of results. Finally, a negated version of the associated terms in conjunction with the standardized summary streams is used to capture a twelfth set of results. The results are then transmitted to the occurrence module as occurrence raw data, with the abstraction layer identified for each set of results.

The search abstraction module does not search for significant or associated terms for the processed context data and standardized summary streams while omitting the significant or associated terms for the formulated proposal because the occurrence should be present in all of the search results.

The results of the search abstraction module may be referred to as occurrence raw data, because it is generally not processed by the search abstraction module. The results may consist of sentences, paragraphs, or pages of text posted or otherwise appearing on websites, applications, and platforms containing the literal, significant, and associated terms of the occurrence.

Occurrence Module

The occurrence module is configured to receive formulated predictions from the natural language module as well as occurrence raw data from the search abstraction module (collectively, occurrence module input). The occurrence module may comprise a set of neural networks configured to determine the likelihood, represented as a percentile, that the prediction will in fact occur using this occurrence module input.

Processed context data is not preferably incorporated directly into the occurrence module input because the purpose of the context data is to assist the natural language module in understanding what the proposal communication means and also to assist the search abstraction module in finding other instances of the occurrence (by virtue of having similar contexts). After the results of the search abstraction module are transmitted to the occurrence module, the context data is considered to be of no further assistance in determining the likelihood of an occurrence.

The likelihood is standardized by the occurrence module into a standardized occurrence percentile, which is then transmitted to the evaluation and proposal formulation module.

Evaluation and Proposal Formulation Module

The evaluation and proposal formulation module is configured to receive the formulated predictions and the standardized occurrence percentile, and determine a first numerical value to offer the user if the formulated prediction ultimately occurs and a second numerical value to require from the user if the formulated prediction ultimately does not occur. The numerical values here may be real or in-game money, or "points" with or without real world exchange value. The first and second numerical values, may be referred to as the "proposal ratio", with the first numerical value operating as the numerator and the second numerical value operating as the denominator. The Proposal ratio, together with the formulated prediction, are processed into proposal data. The proposal data is then transmitted to the proposal communication module.

The evaluation and proposal formulation module may comprise a set of neural networks, which initially may be trained using past finalized occurrence data sets, together with proposal ratios corresponding to those finalized occurrence data sets, as well as acceptance data, with the acceptance data corresponding to whether or not users agreed to accept the proposal. Additional training may continue with each additional set of acceptance data and its corresponding finalized occurrence data set and proposal ratio.

Proposal Communication Module

The proposal communication module may be configured to receive the proposal data from the evaluation and proposal formulation module, to embed the proposal data in an audio or visual proposal communication, such a text or speech clip, and to transmit the proposal communication to the initial user via the platform. This proposal communication may be referred to as the "local proposal communication". The proposal communication module may also transmit so-called "global proposal communications" to users other than the initial user.

If the user communicated a wager element, the proposal ratio when incorporated into the proposal communication will be represented in the form (wager element)/x by solving for x as follows:

$x = [(\text{wager element})(\text{second numerical value})]/(\text{first numerical value})$.

Acceptance Determination Module

The acceptance determination module is configured to inquire as to whether a user is accepting or rejecting a proposal communication; and if a user rejects a local proposal, whether they are doing so because the local proposal communication fails to match the user's prediction, in which case the complaint of non-matching is transmitted to the natural language module for further training. The acceptance determination module determines its confidence level in understanding the user. If the confidence level is high, as determined by administrators of the system, then acceptances are transmitted to the proposal fulfillment module, and both acceptances and rejections are transmitted to the transient desirability module to refine the proposal desirability value and the evaluation and proposal formulation module for further training; but if the confidence level is low, the acceptance determination module will either request confirmation from the user, or offer a binary yes/no option in order to resolve the determination.

If the user accepts the local proposal communication, the acceptance may be transmitted to the proposal fulfillment module. If the user identifies the local proposal communication as not comporting with the user's initial prediction, then the designation of non-matching, together with the natural language communication and the formulated prediction are used for further training by the natural language module. Whether the user accepts or rejects the local proposal communication, so long as non-matching is not designated by the user, the acceptance or rejection is used to calculate a proposal desirability value by a transient desirability module, which transmits local proposal communications to other users based on their desirability values in the form of so-called "global proposal communications". These global proposal communications are transmitted to other users who are determined to be consuming the same streaming content as the initially described user. Their acceptance and rejection rates are sent back to the transient desirability module for revising the proposal desirability value. Similarly, if the accept the global proposal communication, the acceptance is transmitted to the proposal fulfillment module.

Proposal Fulfillment Module

The proposal fulfillment module is configured to receive acceptance communications from the acceptance determination module. In one version, the proposal fulfillment module then may transfer the second numerical value from a fulfillment account associated with the user to a "pending" account, and may transfer the first numerical value from a third fulfillment account to the pending account as well. The transfer is resolved upon receiving an outcome determination from the outcome determination module—if the outcome confirms the prediction, then the first and second numerical values are both transferred to the user's fulfillment account, but if the outcome determination negates the prediction, then the second numerical value is transferred from the pending account to the third fulfillment account. In another version, the proposal fulfillment module subtracts the second numerical value from the user's fulfillment account if the outcome determination negates the prediction and adds the first numerical value to the user's fulfillment account of the outcome determination confirms the prediction.

Outcome Determination Module

The outcome determination module may comprise a set of neural networks configured to determine the outcome of the formulated prediction. The outcome determination module may base this determination of confirmation (i.e., the prediction occurred) or negation (the prediction did not occur) based on the standardized summary streams received from the recent transpiration recordation module. The determination may also be based on the continued acquisition and processing of secondary context data and occurrence raw data. The outcome determinations may then be transmitted to the evaluation and proposal formulation module to assist in further evaluation training, the proposal fulfillment module to enable it to properly fulfill the proposal communication, and the proposal communication module for communicating the outcome determination to the user. If the acceptance determination module transmits to the outcome determination module a complaint that the outcome determination was incorrect, then a notification will be sent to an administrator to review the validity of the outcome determination. In one variation, if a sufficient number of complaints are made from users as to the validity of a given outcome determination, then the outcome determination module may reverse the outcome determination, which is then transmitted again to the evaluation and proposal formulation module for additional evaluation training, the proposal fulfillment module for reversing its earlier fulfillment and fulfill the reversed outcome determination, and the proposal communication module for communication the reversed outcome determination to the user. All complaints are used by the outcome determination module for further training.

Transient Desirability Module

The transient desirability module is configured to adjust the proposal desirability value based on acceptance and rejection events from users, and select proposal communications with the higher proposal desirability values for global transmission. In one version, the number of global users set to receive a given proposal communication corresponds to the proposal desirability value such that proposal communications with higher proposal desirability values are transmitted to more global users than proposal communications with lower proposal desirability values, but both proposal communications are in fact transmitted. In another version, only proposal communications with a designated threshold of proposal desirability values are transmitted to global users, while proposal communications below that threshold are not transmitted.

DETAILED DESCRIPTION OF THE DRAWINGS

Figure 1:
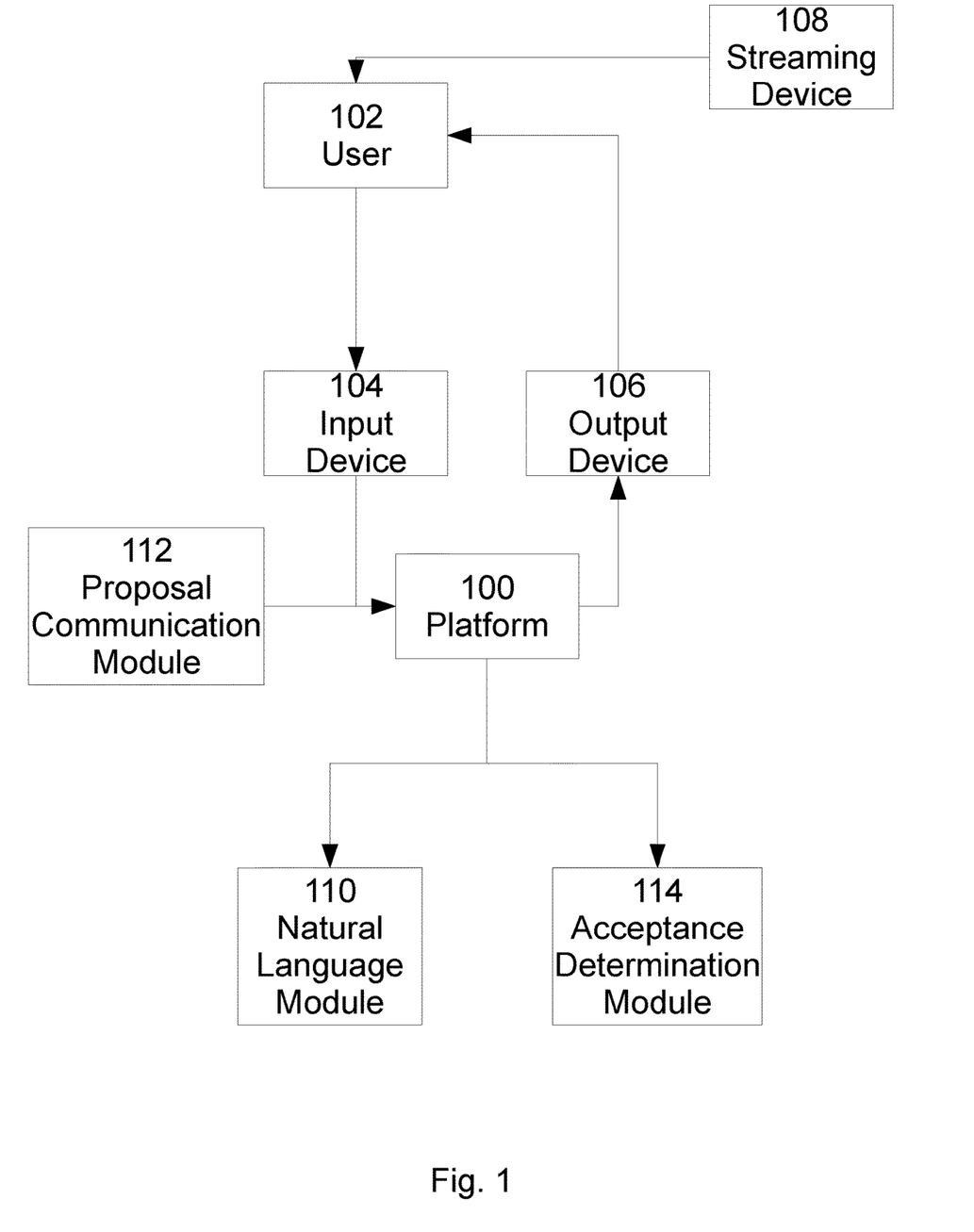
FIGS. 1-3 are diagrams showing exemplary system architecture.

As shown in FIG. 1, the system may comprise a platform 100 which receives prediction pertaining to an occurrence in a streamed media, from a user 102 via an input device 104, and communicates with the user via an output device 106. The user is viewing the streamed media on a streaming device 108. The platform transmits the prediction to the natural language module 110. Proposal communications created by a proposal communication module 112, which the platform proposes to the user. Acceptances, rejections, or other communications from the user in response to the proposal communication are transmitted by the platform to the acceptance determination module 114.

Figure 2:
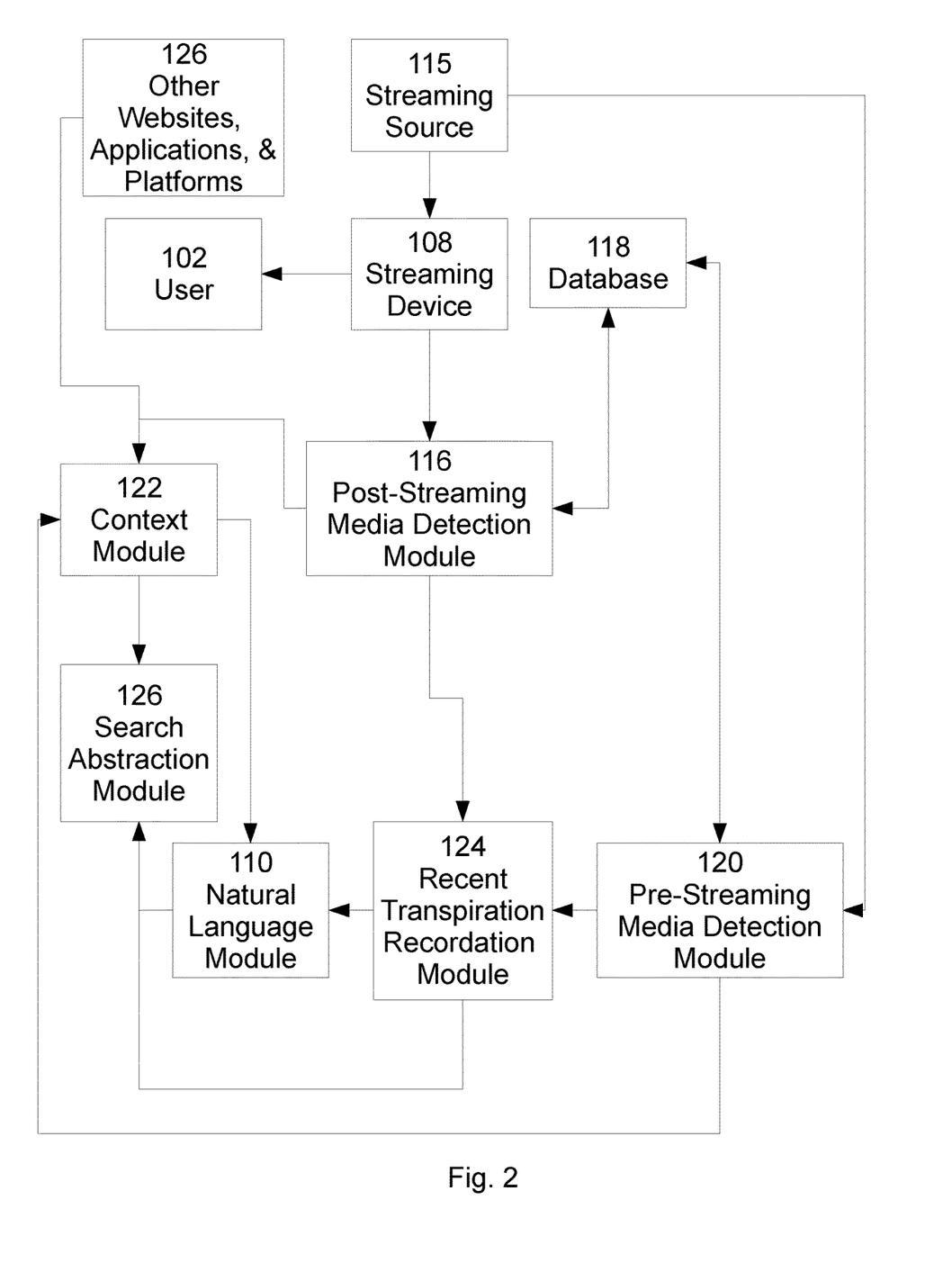

As shown in FIG. 2, the streaming source 108 streams content from a streaming source 115. The post-streaming media detection module 116 captures audio and video data from the streaming device which it compares with a streamed media database 118 in order to identify the streamed content. The identifying information is transmitted to the context module 122 as unprocessed context data. The pre-streaming media detection module 120 captures metadata from the streaming source, which it compares with the streamed media database in order to identify the streamed content—this too is transmitted to the context module 122 as unprocessed context data. The context data of the pre and post streaming media detection modules are also transmitted to a recent transpiration recordation module 124. The context module 122, in turn, searches for additional context data across various websites, external applications, and platforms 128, and then processes all of the context data and transmits it to the natural language module 110.

The natural language module 110 receives the prediction from the user via the platform, and standardizes the prediction using natural language processing neural networks into a formulated prediction. The neural networks use not only the natural language prediction, but also standardized summary streams from the recent transpiration recordation module 124 and processed context data from the context module 122. The recent transpiration recordation module builds its standardized summary streams by processing the audio and video data captured by the post-streaming media detection module, separating the audio and video data into separate timespans. The search abstraction module 126 receives processed context data from the context module 122, the formulated prediction from the natural language module 110, and the standardized summary streams from the recent transpiration recordation module 124. The search abstraction module then uses this input to search for occurrences at varying levels of abstraction, with the searches performed over the internet.

Figure 3:
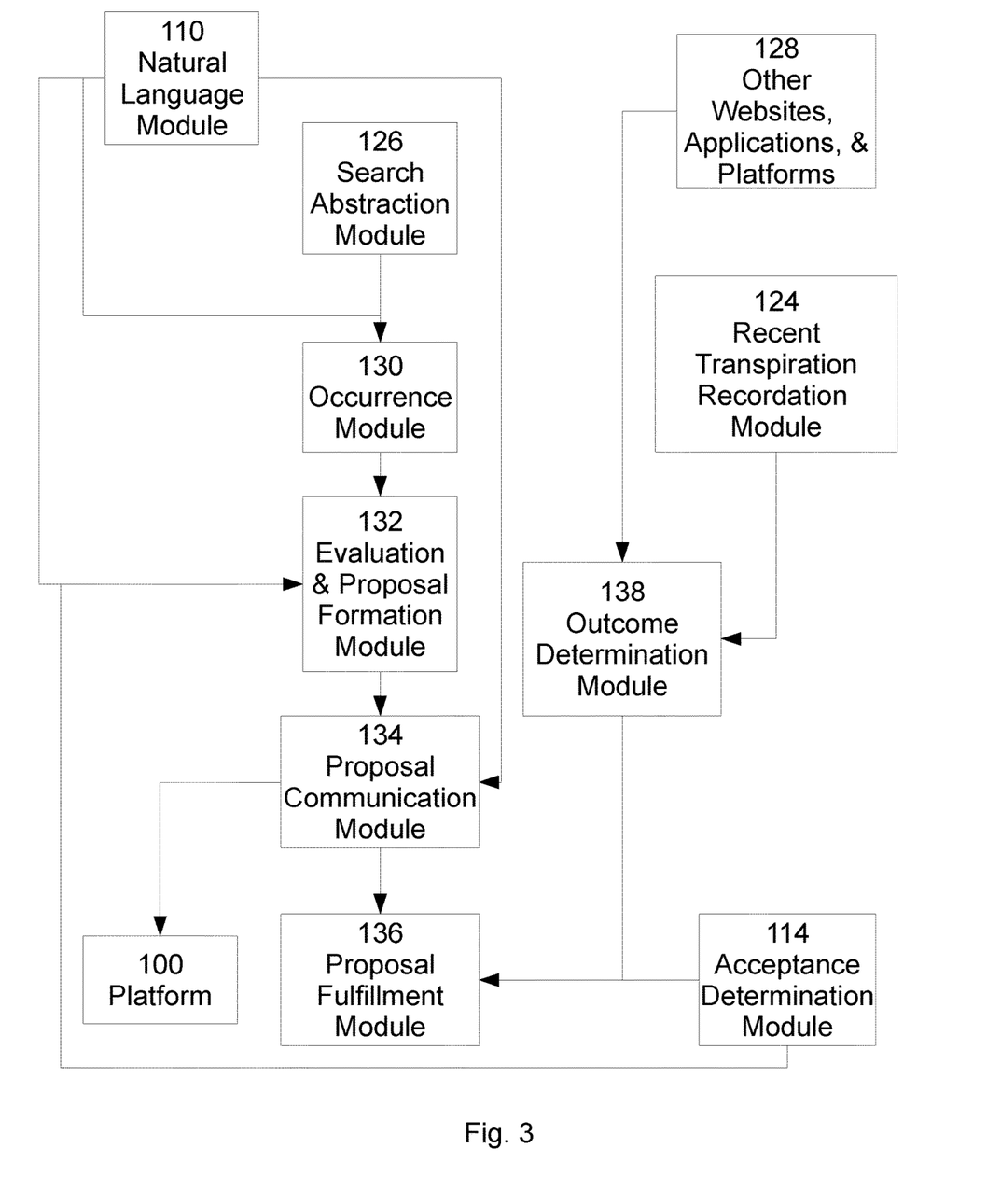

As shown in FIG. 3, the occurrence module 130 is configured to process, via neural networks, the raw occurrence data transmitted by the search abstraction module 126, and the formulated prediction created by the natural language module 110, to determine an occurrence percentile, which is the likelihood that the occurrence targeted by the formulated prediction is going to occur. This occurrence percentile is then transmitted to the evaluation and proposal formulation module 132, which determines a proposal ratio based to be applied to the formulated prediction. The proposal ratio is understood as a first numerical value and a second numerical value, with the first numerical value corresponding to what the user will receive if the user's prediction is determined to occur, and the second numerical value corresponding to what the user will lose if the user's prediction does not occur. As a trend, the higher the occurrence percentile, the lower the first numerical value and the higher the second numerical value. However, as it is desirable to obtain a higher acceptance rate by users of the proposals, the acceptance rate of the proposal by other users as received from the acceptance determination module 114, is also used by the evaluation and proposal formulation module in forming the proposal ratio. This proposal ratio is then transmitted to a proposal communication module 134 which forms a proposal communication using the proposal ratio and the formulated prediction. The proposal communication is communicated to the user via the platform 100 and to the proposal fulfillment module 136. If an acceptance is also received for the proposal communication from the acceptance determination module 114, then the proposal fulfillment module will fulfill the proposal communication vis-à-vis the user fulfillment account. Whether the first numerical value is added to the user fulfillment account or the second numerical value subtracted depends on the outcome determination of the formulated prediction, as transmitted to the proposal fulfillment module from the outcome determination module 138. The outcome determination module makes the determination based on processing, via its neural networks, the standardized summary streams (from the recent transpiration recordation module 124) with timespans covering the period in which the occurrence might have occurred, as well as confirmations received via external websites, applications, and platforms 128.

Figure 4:
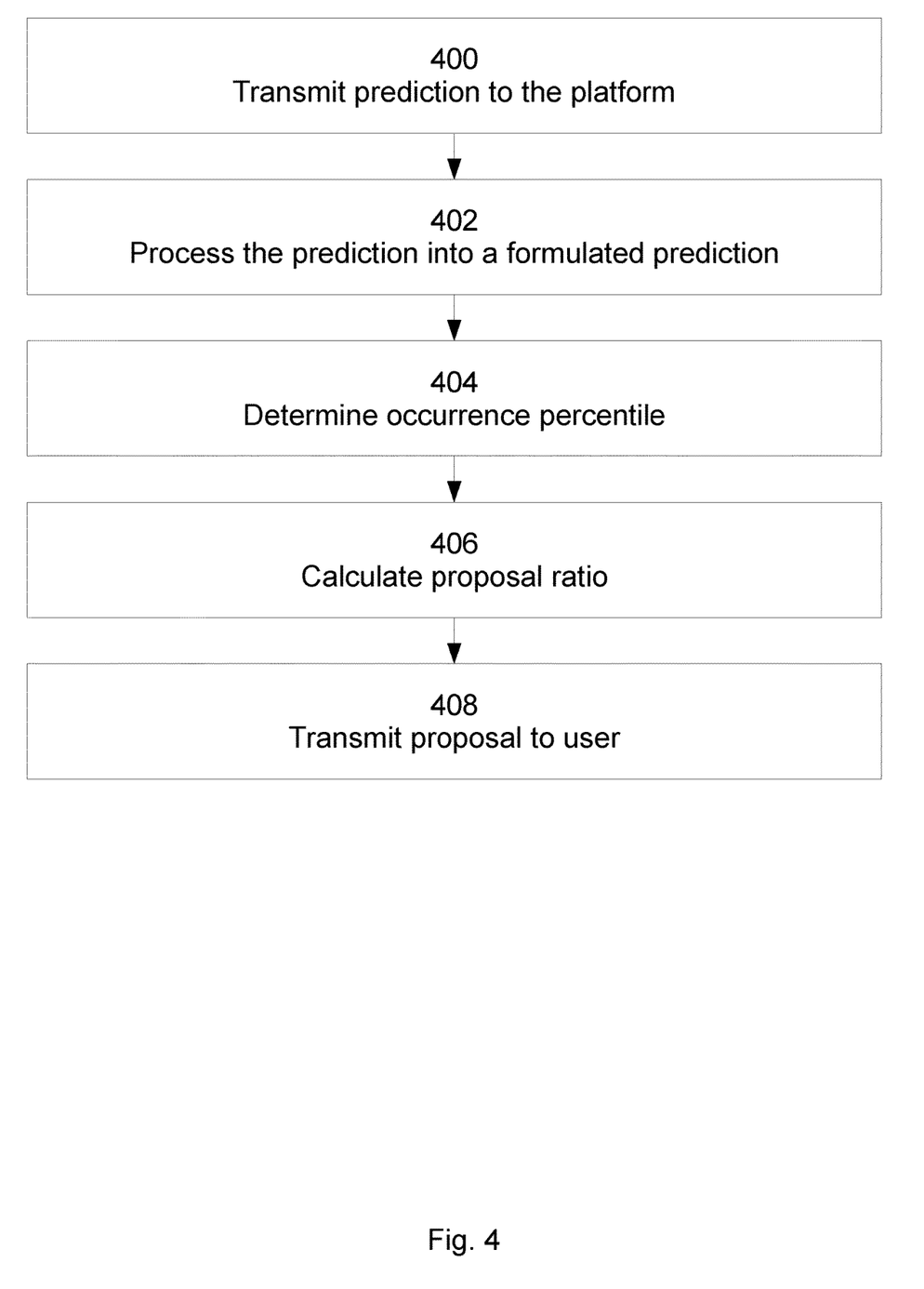
FIGS. 4-7 are flowcharts showing exemplary system processes.

As shown in FIG. 4, a user communicates a prediction to the platform via the input devices 400, then the platform, via the natural language module, processes the prediction into a formulated prediction 402. The likelihood that the occurrence embedded in the formulated prediction is determined as an occurrence percentile 404. A proposal ratio, consisting of an amount a user will gain if the occurrence occurs and an amount the user will lose if the occurrence does not occur, is calculated using the occurrence percentile. The proposal ratio and the formulated prediction are combined into a proposal 406 which is then communicated to the user 408.

Figure 5:
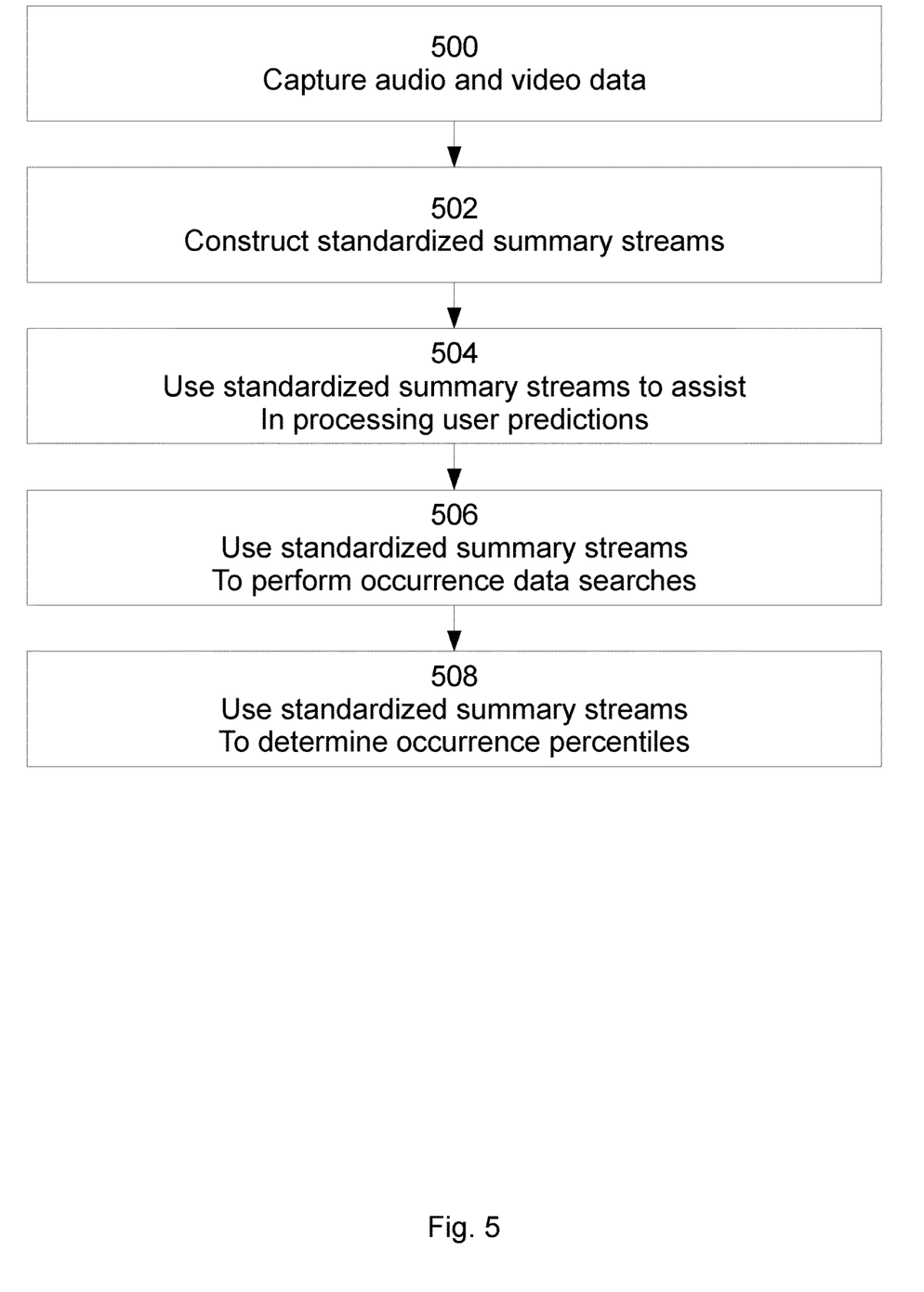

As shown in FIG. 5, audio and video data from the streaming device is captured 500, whereafter they are used to construct standardized summary streams across a plurality of timespans 502. These standardized summary streams are used to assist in processing the user prediction 504, perform searches for occurrence data 506, and determining the occurrence percentile 508.

Figure 6:
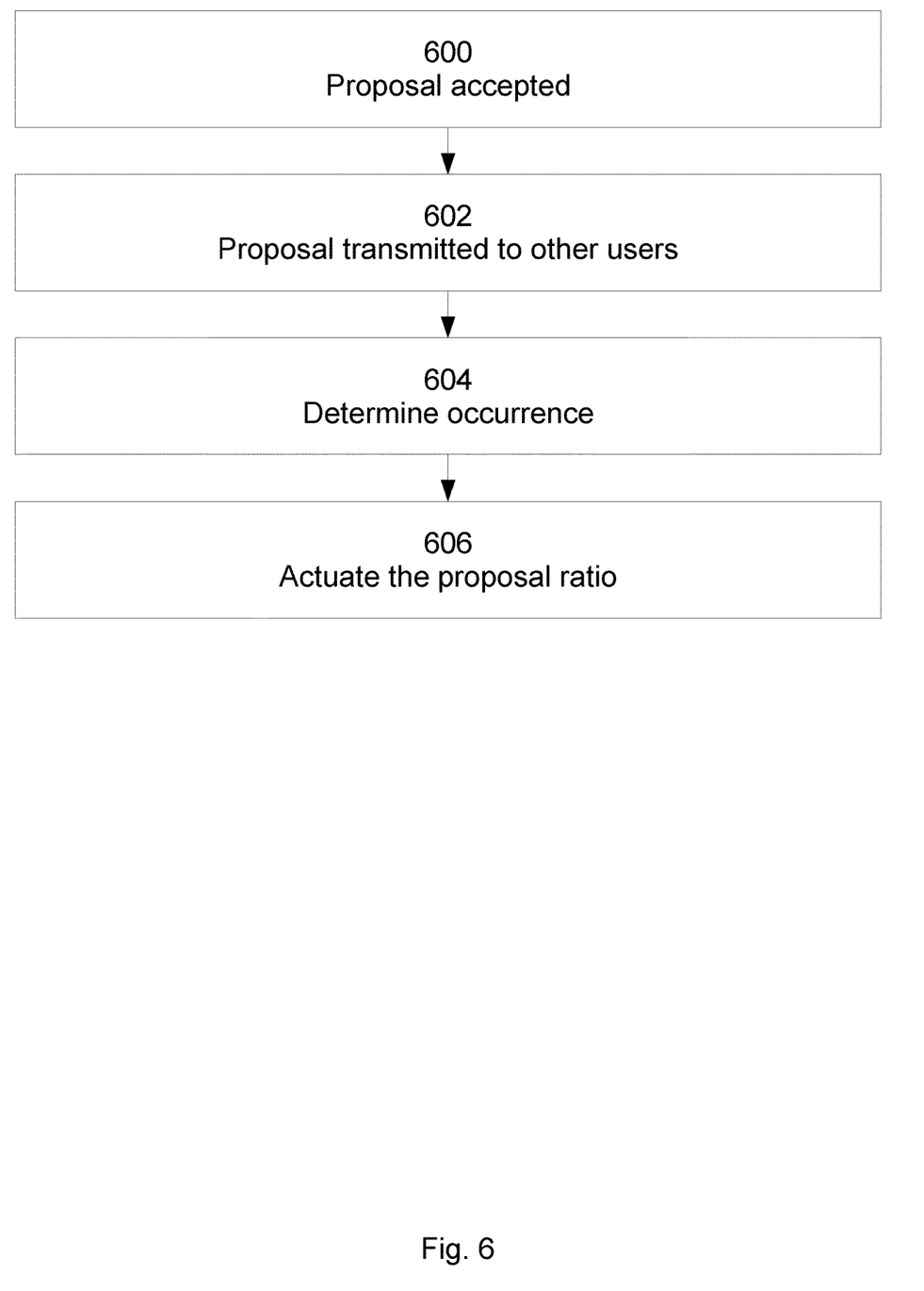

As shown in FIG. 6, if a user accepts the proposal 600, the proposal is transmitted to other users 602. The occurrence is determined 604, whereafter the proposal ratio is actuated 606.

Figure 7:
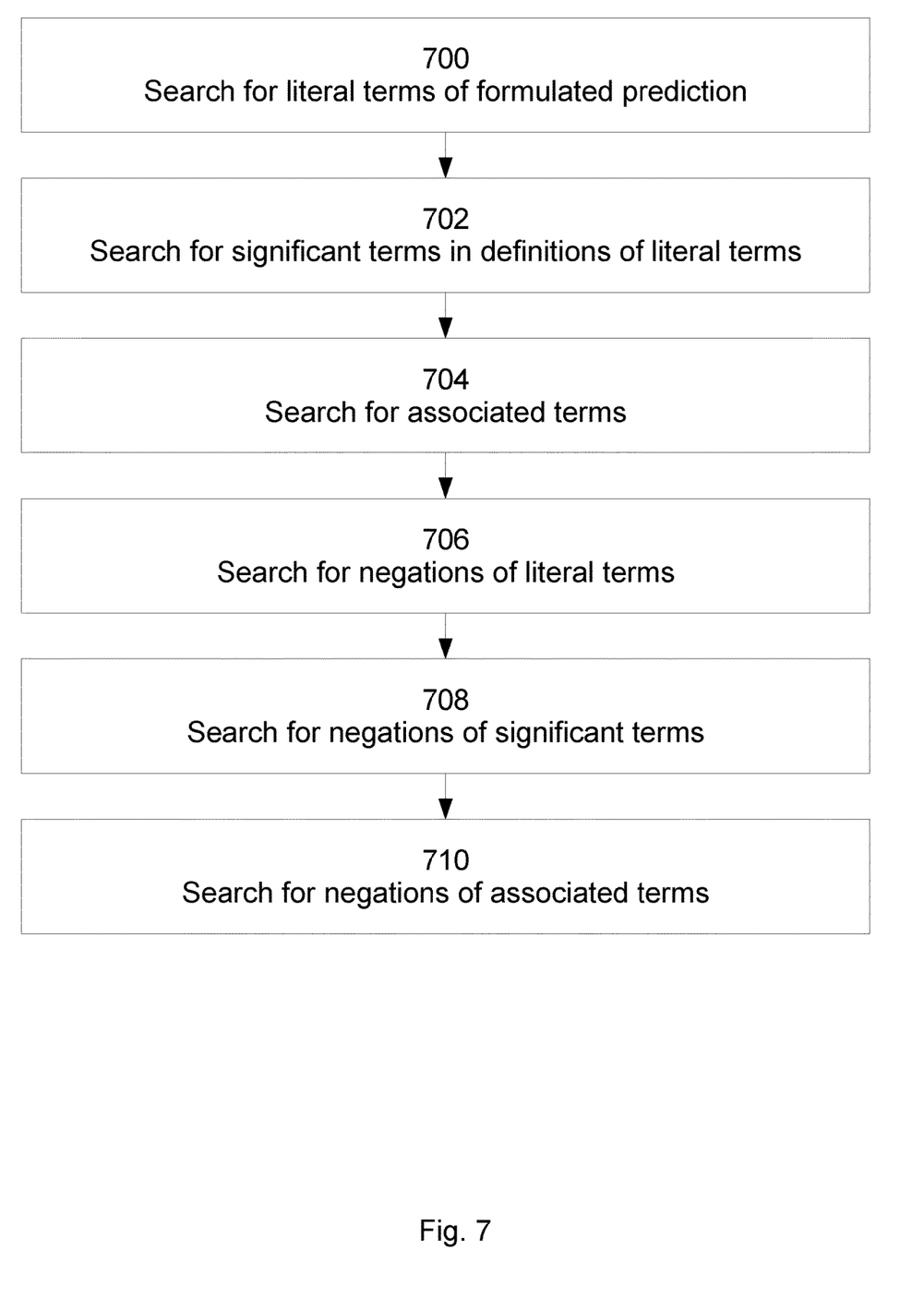

As shown in FIG. 7, occurrence data is obtained by searching for literal terms of the formulated prediction 700, searching for significant terms in definitions of the literal terms 702, and searching for associated terms 704, searching for negations of literal terms 706, searching for negations of significant terms 708, and searching for negations of associated terms 710.

In one embodiment, the standardized summary streams are processed to extract significant events and facts. This processing may occur by keyword detection. These significant events and facts are used to search a common play database, with the common play database comprising lists of common plays associated with significant events and facts. The platform selects a set of common plays based on confidence levels in matching the significant events and facts and/or the frequency of the common plays. The selected common plays may be represented by pictures and/or text (common play representations). These common play representations may be presented to the user via the output devices. The platform may detect a selection by the user of one of the common play representations. In one variation, each common play representation presented to the user includes a unique proposal ratio, with the unique proposal ratio determined based on the confidence levels and/or frequency of the common play. The proposal ratio may be actuated based on determination of the occurrence outcome, as described elsewhere.

In one embodiment, the audio and video data may include communications by the user describing significant events and facts transpiring in the streamed content.

The invention claimed is:

1. A system comprising a streaming device, a set of input devices, a set of output devices, a natural language module, a recent transpiration recordation module, a search abstraction module, an occurrence module, an evaluation and proposal module, a proposal communication module, an acceptance determination module, a proposal fulfillment module, an outcome determination module, and a user fulfillment account;
   a. with the streaming device being a television, computer, or mobile device and configured to be used by a user to stream media content;
   b. with the set of input devices configured to receive a natural language prediction from the user and transmit the natural language prediction to the natural language module;
      i. with the natural language prediction pertaining to an occurrence in the streamed media content;
   c. with the natural language module comprising neural networks and configured to
      i. standardize the natural language prediction by processing it into a formulated prediction;
         1. with the formulated prediction having a standardized communication format;
      ii. transmit the formulated prediction to the search abstraction module, the occurrence module, and the evaluation and proposal formulation module;
   d. with the recent transpiration recordation module configured to:
      i. receive audio and video data from the streaming device,
      ii. divide the audio and video data into a plurality of timespans;
      iii. then process the separate timespans of audio and video data into the standardized communication format using image recognition and natural language processing to create standardized summary streams; and
      iv. then transmit the standardized summary streams to the natural language module to assist in processing the natural language prediction;
   e. with the search abstraction module configured to:
      i. isolate literal terms in the formulated prediction, define the literal terms using an internet or software dictionary;
      ii. determine significant terms from definitions of the literal terms by eliminating frequently used words;
      iii. determine associated terms of the significant terms by using an internet or software thesaurus;
      iv. then perform searches for the literal terms, significant terms, and associated terms;
      v. then capture results of the searches, with the results being sentences, paragraphs, and pages containing the terms; and
      vi. then transmit the results to the occurrence module as occurrence raw data;

f. with the occurrence module configured to:
   i. receive the formulated prediction from the natural language module and occurrence raw data from the search abstraction module;
   ii. determine a likelihood of the occurrence occurring using neural networks to process the occurrence raw data; and
   iii. transmit to the evaluation and proposal formulation module the likelihood of the occurrence occurring as an occurrence percentile;
g. with the evaluation and proposal formulation module configured to:
   i. receive the formulated prediction from the natural language module and the occurrence percentile from the occurrence module;
   ii. calculate a proposal ratio based on the occurrence percentile;
   iii. combine the proposal ratio and the formulated prediction into proposal data; and
   iv. transmit the proposal data to the proposal communication module;
   v. with the proposal ratio comprising a first numerical value over a second numerical value;
h. with the proposal communication module configured to:
   i. receive the proposal data from the evaluation and proposal formulation module,
   ii. embed the proposal data in an audio or visual proposal communication,
   iii. transmit the proposal communication to the user;
i. with the acceptance determination module configured to:
   i. determine whether the user accepts or rejects the proposal communication;
   ii. transmit complaints of non-matching to the natural language module for further training of the natural language neural networks; and
   iii. transmit an acceptance communication of the proposal communication to the proposal fulfillment module;
j. with the outcome determination module configured to:
   i. receive standardized summary streams from the recent transpiration recordation module;
   ii. determine an outcome of the formulated prediction using the standardized summary streams;
   iii. and transmit the outcome determination to the proposal fulfillment module;
k. with the proposal fulfillment module configured to:
   i. receive the acceptance communication from the acceptance determination module, the proposal communication from the evaluation and proposal formulation module, and an outcome determination from the outcome determination module; and
   ii. transfer the first numerical value to the user fulfillment account if the outcome determination confirms the prediction, or subtract the second numerical value from the user fulfillment account if the outcome determination negates the prediction.

2. The system of claim 1, additionally comprising a context module;
   a. with the context module configured to perform a search for context data based on identification information pertaining to the streamed content, and then process results of the search for context data into processed context data, then transmit the processed context data to the natural language module to assist in processing the natural language prediction from the user.

3. The system of claim 1, with the acceptance determination module further configured to:
   a. transmit complaints of non-matching to the natural language module for further training of the natural language neural networks.

4. The system of claim 1, with the standardized communication format identifying a number of discrete predictions, with each discrete prediction having a subject, a condition or action, and an object.

5. The system of claim 1, additionally comprising a pre-streaming media detection module,
   a. with the pre-streaming media detection module configured to capture identification data pertaining to the streamed media content from meta-data associated with the streamed media content.

6. The system of claim 1, additionally comprising a post-streaming media detection module,
   a. with the post-streaming media detection module configured to capture identification data pertaining to the streamed media content by recording audio or image samples from the streamed media content and matching the audio or image samples to a database of streaming content.

7. The system of claim 1, additionally comprising a transient desirability module,
   a. with the transient desirability module configured to calculate a desirability value for each proposal communication using acceptance and rejection rates received from the acceptance determination module.

8. A method of enabling users to engage in predictions pertaining to streamed media, including the steps of:
   a. receiving a natural language prediction from a user via input devices, with the natural language prediction pertaining to an occurrence in a streamed media;
   b. standardizing the natural language prediction into a formulated prediction using natural language processing neural networks;
   c. performing occurrence searches for terms of the formulated prediction;
      i. with terms of the formulated prediction being literal terms in the formulated prediction, significant terms found in definitions of the literal terms, or associated terms which are synonymous with the significant terms;
   d. capturing results of the occurrence searches, with the results being occurrence raw data;
   e. determining a likelihood of the occurrence in the formulated prediction occurring using neural networks to process the occurrence raw data, with the likelihood being an occurrence percentile;
   f. calculating a proposal ratio based on the occurrence percentile, with the proposal ratio consisting of a first number and a second,
      i. with the first number being a value to be added to an account associated with the user if the formulated prediction is determined to occur and the second number being a value subtracted from the account if the formulated prediction is determined not to occur;
   g. combining the proposal ratio and the formulated prediction into a proposal communication;
   h. transmitting the proposal communication to the user via output devices;
   i. determining whether the user accepts or rejects the proposal communication;

j. adding the first number to the account if the formulated prediction is determined to occur or subtract the second number if the formulated prediction is determined not to occur.

9. The method of claim 8, additionally comprising the steps of:
   a. performing a context search using identification information pertaining to the streamed content;
   b. capturing results of the context search, with the results being context data;
   c. using the context data to in conjunction with the terms of the formulated prediction when performing occurrence searches.

10. The method of claim 8, additionally comprising the steps of:
   a. performing a context search using identification information pertaining to the streamed content;
   b. capturing results of the context search, with the results being context data;
   c. entering the context data in conjunction with the natural language prediction into the natural language processing neural networks when standardizing the natural language prediction into the formulated prediction.

11. The method of claim 8, with the formulated prediction having a standardized communication format, with the standardized communication format identifying a number of discrete predictions, with each discrete prediction having a subject, a condition or action, and an object.

12. The method of claim 8, additionally comprising the steps of:
   a. capturing audio and video data from the streamed content,
   b. separating the audio and video data into a plurality of separate timespans,
   c. processing the plurality of separate timespans of audio and video data into a standardized communication format using image recognition and natural language processing to create standardized summary streams;
   d. entering the standardized summary streams in conjunction with the natural language prediction into the natural language processing neural networks when standardizing the natural language prediction into the formulated prediction.

13. The method of claim 8, with terms of the formulated prediction including both literal and significant terms.

14. The method of claim 8, with terms of the formulated prediction including both significant terms and associated terms.

15. The method of claim 8, additionally comprising the steps of:
   a. receiving complaints from of the proposal communication not matching the natural language prediction, then retraining the natural language processing neural networks using the complaints.

16. The method of claim 8, additionally comprising the steps of: determining if the formulated prediction has occurred using by processing the standardized summary streams using the neural network.

17. A method of enabling users to engage in predictions pertaining to streamed media, including the steps of:
   a. receiving a natural language prediction from a user via input devices, with the natural language prediction pertaining to an occurrence in a streamed media;
   b. capturing audio and video data from the streamed content,
   c. separating the audio and video data into a plurality of separate timespans;
   d. processing the plurality of separate timespans of audio and video data into a standardized communication format using image recognition and natural language processing to create standardized summary streams;
   e. standardizing the natural language prediction into a formulated prediction using natural language processing neural networks;
   f. determining a likelihood of the occurrence in the formulated prediction occurring using neural networks to process the standardized summary streams, with the likelihood being an occurrence percentile.

18. The method of claim 17, additionally comprising the steps of:
   a. calculating a proposal ratio based on the occurrence percentile, with the proposal ratio consisting of a first number and a second,
      i. with the first number being a value to be added to an account associated with the user if the formulated prediction is determined to occur and the second number being a value subtracted from the account if the formulated prediction is determined not to occur;
   b. combining the proposal ratio and the formulated prediction into a proposal communication;
   c. transmitting the proposal communication to the user via output devices;
   d. determining whether the user accepts or rejects the proposal communication;
   e. adding the first number to the account if the formulated prediction is determined to occur or subtract the second number if the formulated prediction is determined not to occur.

19. The method of claim 17, additionally comprising the steps of:
   a. entering the standardized summary streams in conjunction with the natural language prediction into the natural language processing neural networks when standardizing the natural language prediction into the formulated prediction.

20. The method of claim 17, additionally comprising the steps of:
   a. performing occurrence searches for terms of the formulated prediction;
      i. with terms of the formulated prediction being literal terms in the formulated prediction, significant terms found in definitions of the literal terms, or associated terms which are synonymous with the significant terms;
   b. capturing results of the occurrence searches, with the results being occurrence raw data;
   c. determining the likelihood of the occurrence in the formulated prediction occurring using neural networks to process the occurrence raw data in conjunction with the standardized summary streams.

* * * * *